(12) United States Patent
Oral et al.

(10) Patent No.: US 11,074,553 B2
(45) Date of Patent: Jul. 27, 2021

(54) MULTIPLE EVENT CALENDAR PROCESSING

(75) Inventors: Tolga Oral, Winchester, MA (US); Andrew L. Schirmer, Andover, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 917 days.

(21) Appl. No.: 12/141,435

(22) Filed: Jun. 18, 2008

(65) Prior Publication Data

US 2009/0319319 A1 Dec. 24, 2009

(51) Int. Cl.
*G06Q 10/10* (2012.01)

(52) U.S. Cl.
CPC ....... *G06Q 10/109* (2013.01); *G06Q 10/1093* (2013.01)

(58) Field of Classification Search
CPC ........... G06Q 10/1093; G06Q 10/1095; G06Q 10/1097
See application file for complete search history.

(56) References Cited

U.S. PATENT DOCUMENTS

| | | | |
|---|---|---|---|
| 4,819,191 A | 4/1989 | Scully et al. | |
| 6,101,480 A | 8/2000 | Conmy et al. | |
| 6,167,379 A | 12/2000 | Dean et al. | |
| 6,640,230 B1 * | 10/2003 | Alexander et al. | 707/999.01 |
| 6,988,128 B1 * | 1/2006 | Alexander et al. | 709/206 |
| 2003/0103415 A1 * | 6/2003 | Bates et al. | 368/28 |
| 2003/0204474 A1 * | 10/2003 | Capek et al. | 705/64 |
| 2004/0064355 A1 * | 4/2004 | Dorenbosch et al. | 705/9 |
| 2004/0064585 A1 * | 4/2004 | Doss | G06Q 10/063116 709/246 |
| 2004/0088362 A1 * | 5/2004 | Curbow | G06Q 10/109 709/207 |
| 2005/0038690 A1 * | 2/2005 | Hayes-Roth | 705/9 |
| 2005/0091095 A1 * | 4/2005 | Wilbrink al. | 705/8 |
| 2006/0041460 A1 * | 2/2006 | Aaron | 705/8 |
| 2006/0129444 A1 * | 6/2006 | Baeza et al. | 705/8 |
| 2007/0106725 A1 * | 5/2007 | Starr et al. | 709/204 |
| 2007/0136119 A1 * | 6/2007 | Record | G06Q 10/109 705/7.19 |
| 2007/0288292 A1 * | 12/2007 | Gauger | G06Q 10/00 405/9 |
| 2008/0059265 A1 * | 3/2008 | Biazetti et al. | 705/8 |
| 2008/0091504 A1 * | 4/2008 | Lyle | G06Q 10/063116 705/7.19 |
| 2008/0140488 A1 * | 6/2008 | Oral et al. | 705/8 |

(Continued)

*Primary Examiner* — Ivan R Goldberg
(74) *Attorney, Agent, or Firm* — Cuenot, Forsythe & Kim, LLC (57) ABSTRACT

A computer-implemented method of processing a plurality of events within a calendar application can include receiving a user input specifying a period of time within a calendar associated with a user, detecting a plurality of events occurring within the period of time, and determining at least one attribute for each of the plurality of events. An event clearing technique can be selected for each of the plurality of events according to the at least one attribute of each respective event. The specified time period can be cleared by executing the selected event clearing technique for each of the plurality of events, wherein an updated calendar is generated. The updated calendar can be output.

20 Claims, 5 Drawing Sheets

(56) References Cited

U.S. PATENT DOCUMENTS

2009/0055235 A1* 2/2009 Oral et al. .................... 705/8
2009/0132329 A1* 5/2009 Lam et al. .................... 705/9
2009/0165022 A1* 6/2009 Madsen et al. ............ 719/318

* cited by examiner

100

| | File Edit Tools Help | | X | Print | Find | | |
|---|---|---|---|---|---|---|---|
105
| | VIEW | 1 Day | 1 Week | 1 Month | Clear Block | | 110 |

115

| April 28 | 29<br>9:00 am<br>Team<br>meeting | 30 | May 1 | 2 | 3 |
|---|---|---|---|---|---|
| | | | Time block to clear 125 | 120 | 4 |
| 5 | 6<br>9:00 am<br>Team<br>meeting | 7 Start date: 5/12<br>End Date: 5/18 | | 9 | 10 |
| | | | | | 11 |
| 12<br>11:30 am<br>Management<br>review | 13<br>9:00 am<br>Team<br>meeting | 14<br>11:00 am<br>Marketing<br>meeting | 15 | 16<br>12:00pm<br>Lunch appt.<br>w/Bill D. | 17 |
| | | | | | 18 |
| 19 | 20<br>9:00 am<br>Team<br>meeting | 21 | 22<br>1:00pm<br>Dentist appt. | 23 | 25 |
| | | | | | 26 |
| 27 | 28<br>9:00 am<br>Team<br>meeting | 29 | 30 | 31 | June 1 |
| | | | | | 2 |

MULTIPLE EVENT CALENDAR PROCESSING

BACKGROUND

Calendar applications can provide a graphical user interface (GUI) which enables a user to associate events with various time and/or dates in a calendar associated with the user. Providing a variety of viewing modes, such as daily, weekly, or monthly views of the schedule of the user, the calendar application supplies an interface through which the user can interact with scheduling information. The user can add calendar events by typing standard phrases into the GUI or via other user operations on objects internal or external to the calendar application.

Calendar applications can be an integral part of time and project management tools. This integration of applications allows the calendar application to serve as a central hub for scheduling, arranging meetings, and task management. This information can be shared between applications on a single data processing device, among clients sharing a central network server, and/or via a communications network, e.g., a wireless network or the Internet. As a result, multiple calendars can be manipulated, and shared among users, with the calendar application allowing the users various levels of access.

The sharing of scheduling information between the calendar application and another application can allow the user to affect calendar scheduling from within the user interface of the other application. For example, the user can open an electronic mail message from within an electronic mail application, wherein the electronic mail message contains an invitation to a future meeting. The GUI of the mail application can provide a selectable icon which, when activated by the user, can insert information related to the meeting into the calendar of the user. Upon the user accessing the calendar application, the event information is available within the calendar of the user, without the user having to manually enter the meeting information into the calendar application.

BRIEF SUMMARY OF THE INVENTION

The embodiments disclosed herein relate to calendar applications. One embodiment of the present invention can include a computer-implemented method of processing a plurality of events within a calendar application. The method can include receiving a user input specifying a period of time within a calendar associated with a user, detecting a plurality of events occurring within the period of time, and determining at least one attribute for each of the plurality of events. The method can include selecting an event clearing technique for each of the plurality of events according to the at least one attribute of each respective event, clearing the specified period of time by executing the selected event clearing technique for each of the plurality of events, wherein an updated calendar is generated. The updated calendar can be output.

Another embodiment of the present invention can include a computer-implemented method of processing a plurality of events within a calendar application. The method can include receiving a user input from a user specifying a period of time, detecting a plurality of events occurring within the period of time, and determining a type for each of the plurality of events, wherein type depends upon whether the event is a meeting event. The method can include selecting an event clearing technique for each of the plurality of events according to the type of the event, clearing the specified period of time by executing the selected event clearing technique for each of the plurality of events, wherein an updated calendar is generated. The updated calendar can be output.

Yet another embodiment of the present invention can include a computer program product including a computer-usable medium having computer-usable program code that, when executed, causes a machine to perform the various steps and/or functions described herein.

BRIEF DESCRIPTION OF THE SEVERAL VIEWS OF THE DRAWINGS

FIG. 2 is a second pictorial view illustrating a GUI for a calendar application in accordance with another embodiment of the present invention.

DETAILED DESCRIPTION OF THE INVENTION

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed herein, relate to group processing of calendar events within a calendar application. A user can specify a period of time using a graphical user interface (GUI) of the calendar application. Upon specifying the period of time, the system can search for one or more or all events occurring within the period of time. Attributes associated with each identified event can be determined and an event clearing technique can be selected for each event according to the attributes associated with each respective event. The user specified period of time can be cleared by processing each event using the event clearing technique selected for each detected event. Responsive to the processing of one or more or all of the events, an updated version of the calendar of the user can be generated and output.

Figure 1:
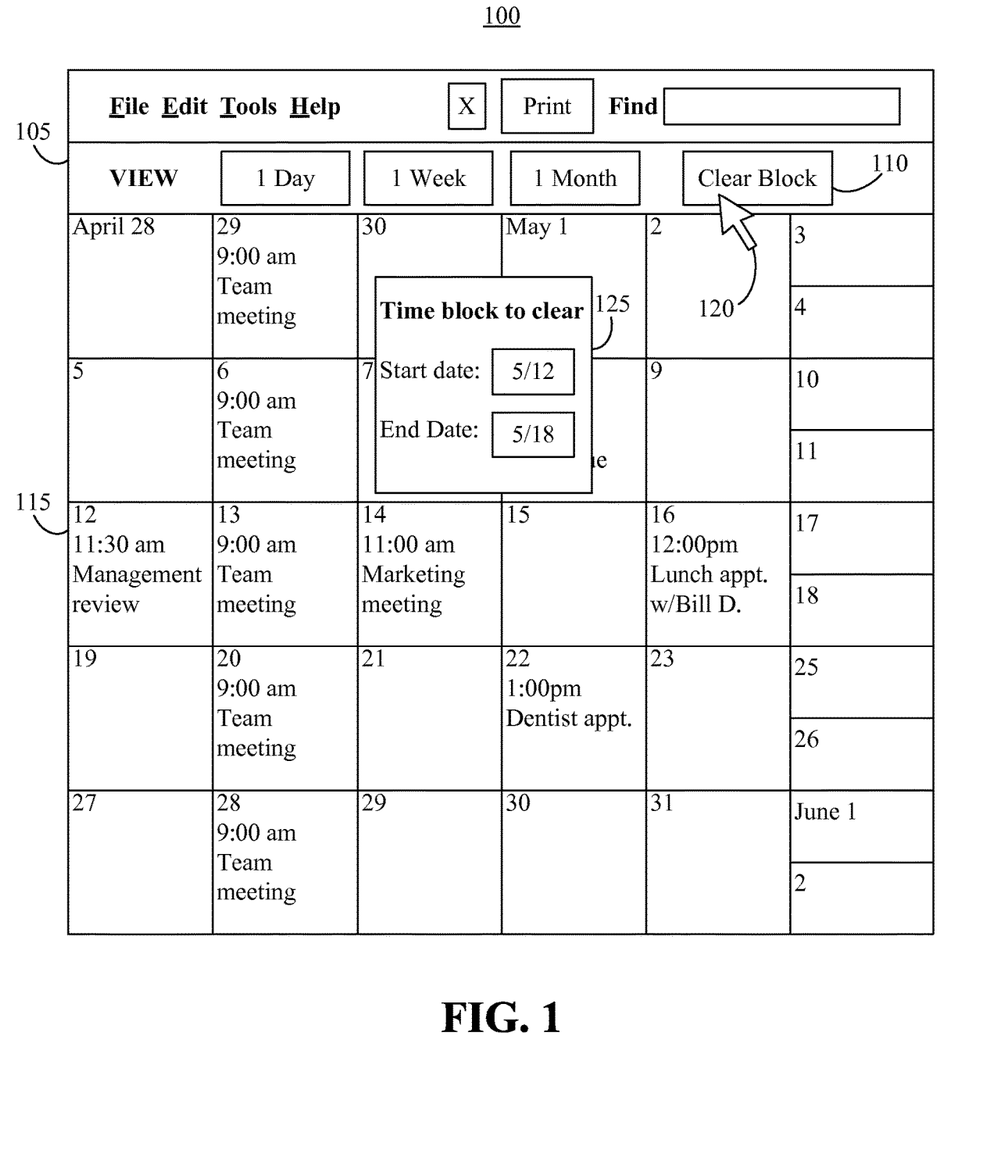
FIG. 1 is a first pictorial view illustrating a graphical user interface (GUI) for a calendar application in accordance with one embodiment of the present invention.

FIG. 1 is a first pictorial view illustrating a GUI 100 for a calendar application in accordance with one embodiment of the present invention. In the embodiment that follows, the GUI 100 can represent an interface through which a user can access the calendar application. The GUI 100 can be used to access, enter, and edit event information within a calendar of the user. As used herein, an "event," can refer to a meeting, task, appointment, deadline, reminder, or any other type of scheduling information that may be entered into a calendar application. An event typically will be associated with a time, date or both, e.g., via an alarm, reminder, or other mechanism. A "calendar" can refer to a collection of events maintained and/or stored in memory by a calendar application for a particular user or users.

As used herein, a "system," can refer to a data processing system executing calendar application software on a data processing system suitable for storing and/or executing program code, whether a single user device running independently or a client and server executing cooperatively in a distributed computing environment. The data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

As pictured, the GUI 100 presents the user with a month view of the calendar of the user. The GUI 100 can include a task bar 105, a clear block icon 110, and a plurality of calendar date boxes such as calendar date box 115. The task bar 105 contains various icons selectable by the user with a pointer 120 for performing various functions in the calendar application. It should be noted that GUI 100 can be implemented in a variety of ways and the representation of the calendar of the user can take on numerous forms. For example, the calendar view in FIG. 1 is the monthly calendar view with a series of selectable menus and icons through which the user can invoke functions of the application. Alternatively, the GUI can present a calendar view showing user activities scheduled within a single day, where the functionality of the application can be invoked with an exclusively menu driven architecture. As such, GUI 100 presents just one embodiment for invoking the functionality of the embodiments disclosed in this specification.

Using the pointer 120, the user can select the clear block icon 110. Responsive to activation of clear block icon 110, the system can initiate a process of specifying a period of time to be cleared in the calendar, and floating window 125 presented. As used herein, to "clear," can refer a number of programmatic actions which lead to the removal of an event from within a predefined period of time. For example, clearing can refer to deleting, declining, delegating, and/or rescheduling an event. In the floating window 125, the user can enter a start date and an end date specifying the period of time to be cleared in the calendar. Although floating window 125 is used herein, various mechanisms can be used to allow the user to specify the period of time. For example, the user can align pointer 120 over calendar date box 115, select calendar date box 115, and drag the pointer 120 across a block of calendar date boxes. The drag operation can select one or more calendar date boxes as the range of calendar dates to be cleared in the calendar.

As shown, each calendar date box, e.g., such as calendar date box 115, can display events occurring within a particular period of time in the calendar. Each event can specify at least a time associated with the event. Other information that may be associated with each event can include, but is not limited to, a period of time, a location, attendees of the event, comments related to the event, or other information. It should be noted that the period of time represented by the calendar date box 115 may not be a single day, but can represent any unit of time, e.g., a week, 8 hours or a single hour, as determined by the selected calendar view.

Responsive to the selection of the period of time to be cleared, the system can search for events stored within the calendar application and identify events that occur or are associated with a date and/or time within the specified period of time. Upon detecting a plurality of events in the specified period of time, the system can generate a list specifying the detected events as well as the information associated with each detected event.

FIG. 2 is a second pictorial view illustrating the GUI 100 for a calendar application in accordance with another embodiment of the present invention. FIG. 2 depicts the GUI 100 of FIG. 1 after a period of time to be cleared has been specified and a list of events occurring within the specified time has been compiled or detected.

Having specified the time period to be cleared, a visual indicator 130 can be displayed in the GUI 100. The visual indicator 130 graphically indicates to the user the specified period of time to be cleared. It should be appreciated that, the specified period of time to be cleared can be indicated using any of a variety of techniques and the embodiments disclosed herein should not be limited to the examples shown. For instance, each calendar block within the specified period of time can be highlighted, shaded or blackened to indicate that the calendar block is within the specified period of time to be cleared and that no further events will be accepted that occur within the specified period of time, e.g., on a shaded calendar block. In addition, the user may be prevented from making additional entries to the specified period of time and invitations to events occurring within the specified period of time may be declined, automatically.

Having detected the list of events to be cleared within the specified period of time, the system can identify attributes of the each detected event. Attributes of an event can include, but are not limited to, a time of the event, a location for the event, invitees to the event, a subject of the event, a duration of the event, whether the event is a recurring event, e.g., a weekly meeting, or any other characteristic of the event that may enable the system to select an event clearing technique for the event, e.g., meeting leader or organizer, essential participants, non-essential participants, etc.

The event clearing technique can be determined for each event of the list of events according to the attributes associated with each event. As used herein, an "event clearing technique," can refer to a method of processing an event which automatically clears the event and implements any further processing required for resolving the event. For example, the event clearing technique can delete an event from the calendar of the user. The event clearing technique can remove the event from the calendar of the user and transmit an electronic message to one or more others associated with the event, e.g., send a declination message. In another example, the event clearing technique can delete an event and transmit a message delegating the event to another user. In still another example, an event clearing technique can reschedule an event to a time and/or date that is outside of the period of time to be cleared.

In one embodiment, the GUI 100 can graphically display, within a window 135, a list containing each of the events detected within the specified period of time. The list of detected events in window 135 can be reviewed by the user. Any events within window 135 that may be determined by the user to require special processing can be selected for manual processing by the user. Further, the system can present information related to any user selected events and provide an interface from which the user can manually process the event(s).

For example, clearing the 11:30 a.m. management review meeting, denoted as event 140, in calendar date box 115 may require the forwarding of review documents by the user to a supervisor. The extra step of transmitting the review documents can lead the user to determine that an automated event clearing technique is inadequate to properly process the clearing of event 140. Selecting the event 140 with the pointer 120 from the list in window 135, the user can indicate to the system that manual processing of event 140 is desired. Upon the user completing the manual processing of event 140, the remainder of the events in window 135 can be automatically processed by the system using the particular event clearing technique automatically selected for each respective event.

Responsive to each detected event being cleared, the calendar of the user can be updated, and the updated calendar of the user can be output. As used herein, "output" or "outputting" can include, but is not limited to, storing data in memory, e.g., writing to a file, writing to a user display or other output device, e.g., playing audible notifications, sending or transmitting to another system, exporting, or the like.

In one embodiment, event information associated with a current state of each of the cleared events can be stored and, responsive to a user input subsequent to the clearing of the events, restored to a time and/or date location occupied in the calendar of the user prior to the events being cleared. In this manner, the user can avoid re-entering cleared event information, e.g. time and/or date of the event, attendees of the event, or the like, when, at a time subsequent to the clearing of the specified period of time, the user wishes to restore the information or place his or her calendar in the state that existed prior to the automated clearing of the events.

For example, on a Monday the user may clear the following week of events in order to leave town to address a problem with a customer. On Wednesday, the problem with the customer can be resolved, thereby eliminating the need to leave town. Responsive to an input from the user, a restore function can be implemented by the system which returns the events, and the information associated with the events, to an original time and/or date location occupied by the events prior to the clearing operation.

In another embodiment, the clearing of the user specified period of time can be delayed for a pre-determined period of time. For example, the user can specify a week in the calendar of the user to be cleared, but indicate that clearing operations are not to be implemented until two days prior to the week to be cleared. In this manner, when the user may be unsure whether the period of time requires clearing, the clearing request can be input to the system, but the process of clearing the specified period of time can be delayed for a period of time necessary to determine that the clearing of the specified the period of time is required.

In yet another embodiment, a common response can be transmitted to each user associated with each cleared event. For example, as an event is processed, an electronic message "Bill will be unable to attend the meeting" can be transmitted to each member associated with the meeting.

In addition, the message can vary according to the attributes associated with the each cleared event. For example, each event clearing technique can generate a specific message, common to the each associated event clearing technique, to be transmitted upon completion of the event clearing technique. For example, a declined event may have an associated message of "Thank you, but John Doe will be unavailable the week of this event," while a rescheduled event may have an associated message of "John Doe has rescheduled this event for the following week as he will be out of town the week of the event." Further, different meeting participants may be sent different messages according to the role of each respective participant in the meeting, e.g., whether a meeting owner, etc.

Figure 3:
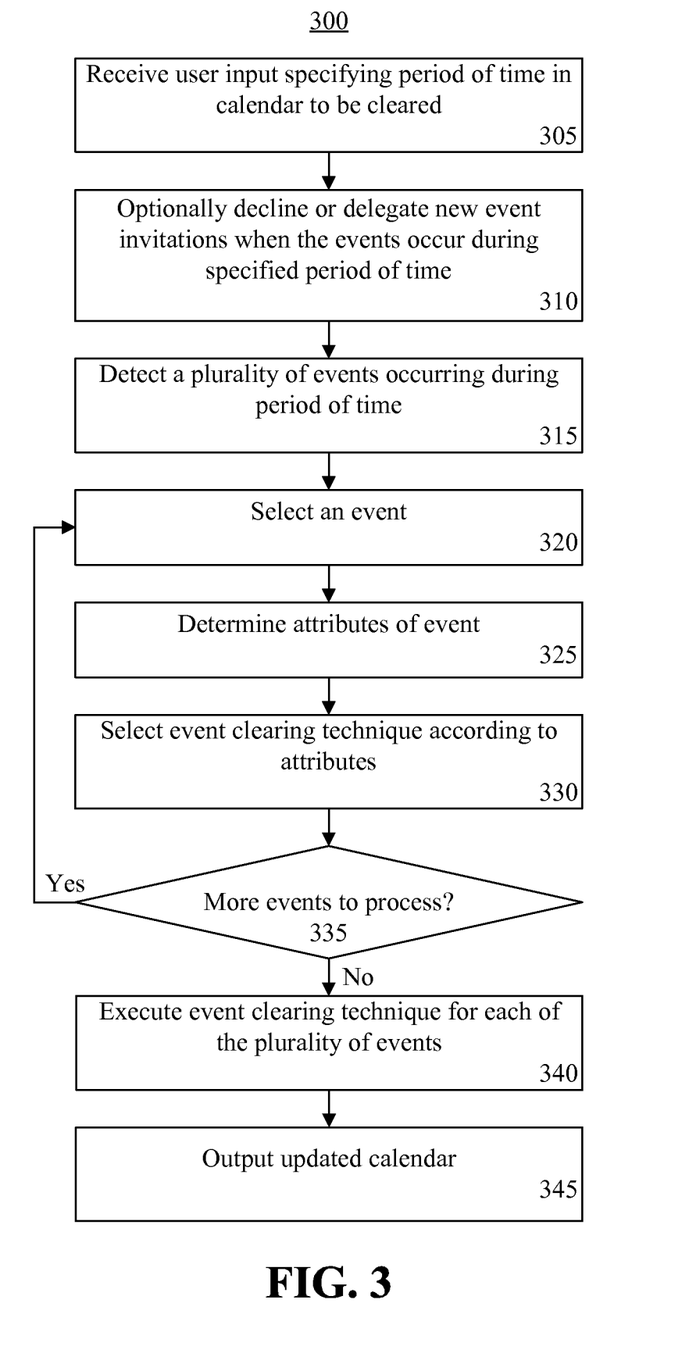
FIG. 3 is a flow chart illustrating a method of processing a plurality of events within a calendar application in accordance with another embodiment of the present invention.

FIG. 3 is a flow chart illustrating a method 300 of processing a plurality of events within a calendar application in accordance with another embodiment of the present invention. The method 300 can be implemented by the system as described with reference to FIG. 1.

The method 300 can begin in step 305, where the system can receive a user input specifying a period of time in the calendar to be cleared. In step 310, the system optionally can decline or delegate invitations received to new events occurring within the specified period of time. Having determined that the specified period of time is to be cleared, the system can monitor for invitations to attend new events received for the calendar. In order to prevent the new events from being entered into the specified period of time to be cleared, the system can identify a time and/or date associated with each invitation to a new event. When the identified time and/or date of the new event occurs within the specified period of time, the system can decline or delegate the event invitation and prevent the addition of the new event to the calendar. Whether the system declines or delegates can be a user selectable option or be performed automatically according to one or more attributes of the event invitation. In one embodiment, the system can transmit an electronic message to the user(s) extending the new event invitation and alert the user(s) that the invitation has been declined or delegated as the case may be.

In step 315, the system can search the calendar application and detect a plurality of events, e.g., each event, occurring during the specified period of time. In searching the calendar application, the system may detect events not visibly displayed within the calendar view of the calendar application. For example, an event which is a task may be displayed in a task panel of the calendar view or in a separate task window, but not within the calendar boxes. Still, such events, e.g., tasks, may be detected if associated with a date that falls within the specified period of time.

In step 320, an event from the plurality of detected events can be selected, and in step 325, attributes of the selected event can be determined. As noted, attributes of the selected event can allow the system to select an appropriate event clearing technique for processing the event according to a class or type of the event. Further, the attributes of the event can be used to classify the event. The classification of the event can be used to determine an appropriate response to the event.

For example, an owner of a calendar can specify a period of time, e.g. December 20-28, to be cleared for a vacation. An event to be cleared from the specified period of time can be a task reminding the owner of the calendar to re-order a necessary resource for a priority project "delta." Project "delta" is to be completed before the end of the year, however, funding for the resource purchase will not be available until the vacation period of the owner. In this case, the system can determine that a first attribute of the event is that the event is a task. In addition, a second attribute of the event can be the association of the task with the "delta" project. As the "delta" project is a priority project, the system can designate that all tasks to be cleared related to the "delta" project must be delegated to other project members. In this manner, attributes of the event to be cleared can be used to ensure that important tasks for the priority project "delta" are not left unaddressed.

In step 330, the appropriate event clearing technique for the event can be selected according to attributes of the event. As noted, the event clearing technique can be a method of processing an event which automatically clears the event and implements any further processing required for resolving the event. Deleting the event, wherein the event is removed from the date and/or time period it occupies within the calendar, can be considered the most basic form of event clearing technique.

In addition, the event can be deleted from the calendar and rescheduled to another time and/or date within the calendar, although outside of the specified period of time to be cleared. In one embodiment, the system can use attributes of the event, and additional parameters, to automatically determine an appropriate time and/or date in the calendar in which to insert, and thereby reschedule, the event. The determination of the appropriate time for rescheduling the event can involve moving the event by a fixed period of time, e.g. reschedule the event 14 days after the originally scheduled date and/or time, or a more complex process using multiple parameters to identify the appropriate time and/or date for rescheduling the event. Additionally, the system can alert other users associated with the event of the rescheduled time and/or date for the event.

For example, the user can specify a week in the calendar of the user to be cleared for travel to a conference. Within the specified week the user has a meeting scheduled with four members of a marketing group working for the user. The system can detect that the meeting is scheduled to occur within the specified period of time and determine, from the attributes associated with the meeting, that the appropriate event clearing technique for the meeting is to reschedule the meeting. Responsive to the determination to reschedule the event, a search of the calendars of the user and the four members of the marketing team can identify a period of time in which all five meeting attendees are available and reschedule the meeting in the available time slot. In addition, an electronic message can be transmitted notifying each meeting attendee of the rescheduling of the meeting.

Further, the event can be delegated to another user or users associated with the event and/or the user. In one embodiment, the system can use attributes of the event, and additional parameters, to automatically determine an appropriate user to which to delegate the event. Additionally, the system can alert the appropriate user, and other users associated with the event, of the delegation of the event to the appropriate user. In another embodiment the user can notify the system which other user should be delegated the event. For example, upon entering the event within the calendar of the user, the system can prompt the user to designate one or more users to whom to delegate the event on the occasion the event requires clearing. In another example, the users to which events are to be delegated can be specified by the user within a set of preferences stored within the calendar application for use with the event clearing techniques.

In step 335, the system can determine whether more events remain to be processed, e.g., more events to be processed from within the specified period of time. If so, the method 300 can return to step 320 and continue processing a next event to be cleared in the specified period of time. If not, the method 300 can proceed to step 340. In step 340, the event clearing technique for each of the plurality of events can be executed. In step 345, the updated calendar, e.g., the calendar of the user after execution of the event clearing techniques, can be output. It should be appreciated that FIG. 3 illustrates an example where the event clearing techniques are first selected and then executed all in batch. The event clearing techniques can, however, be executed individually as each is selected if so desired.

Figure 4A:
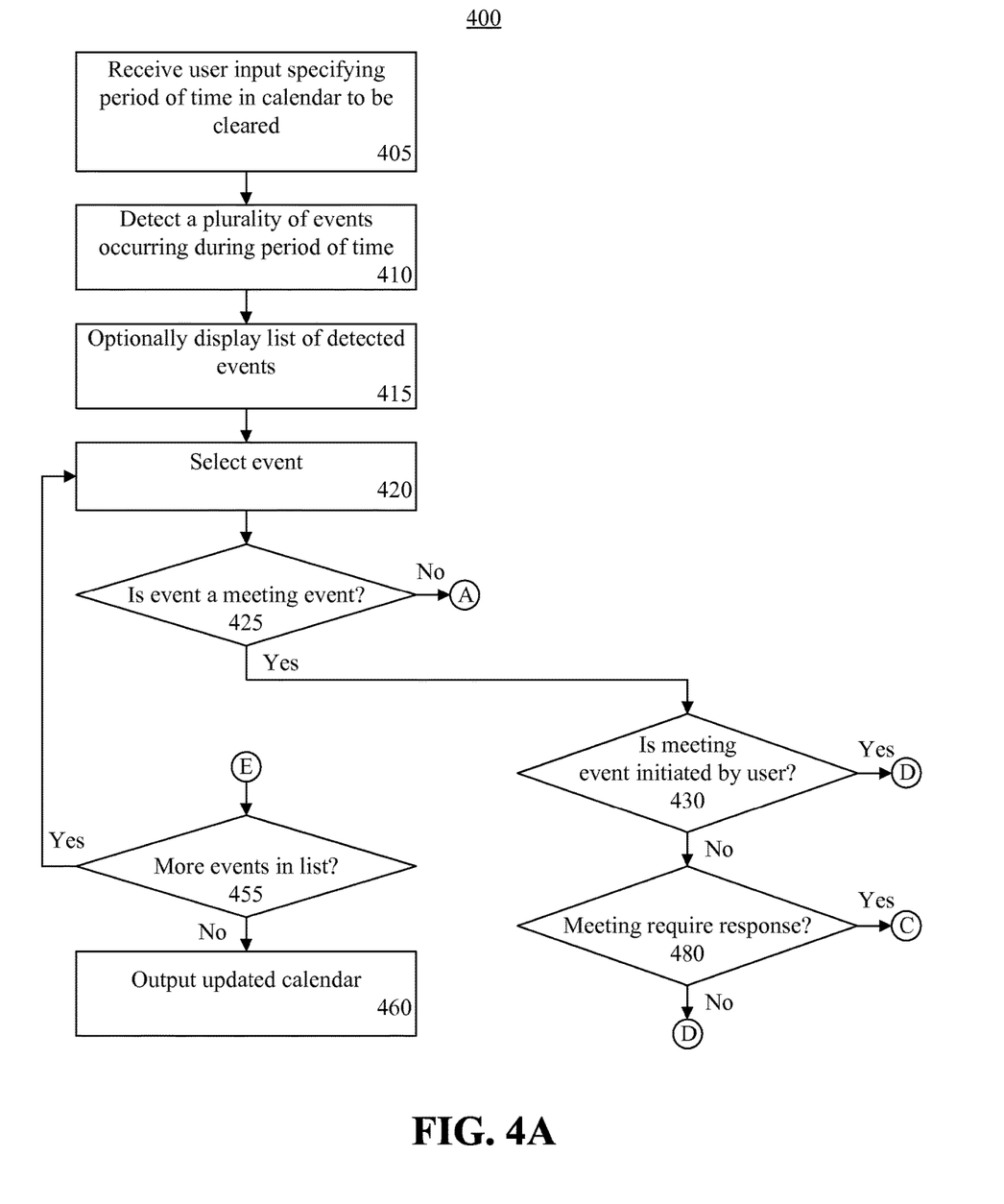
FIGS. 4A-4B, taken collectively, form a flow chart illustrating a method of processing a plurality of events within a calendar application in accordance with another embodiment of the present invention.
Figure 4B:
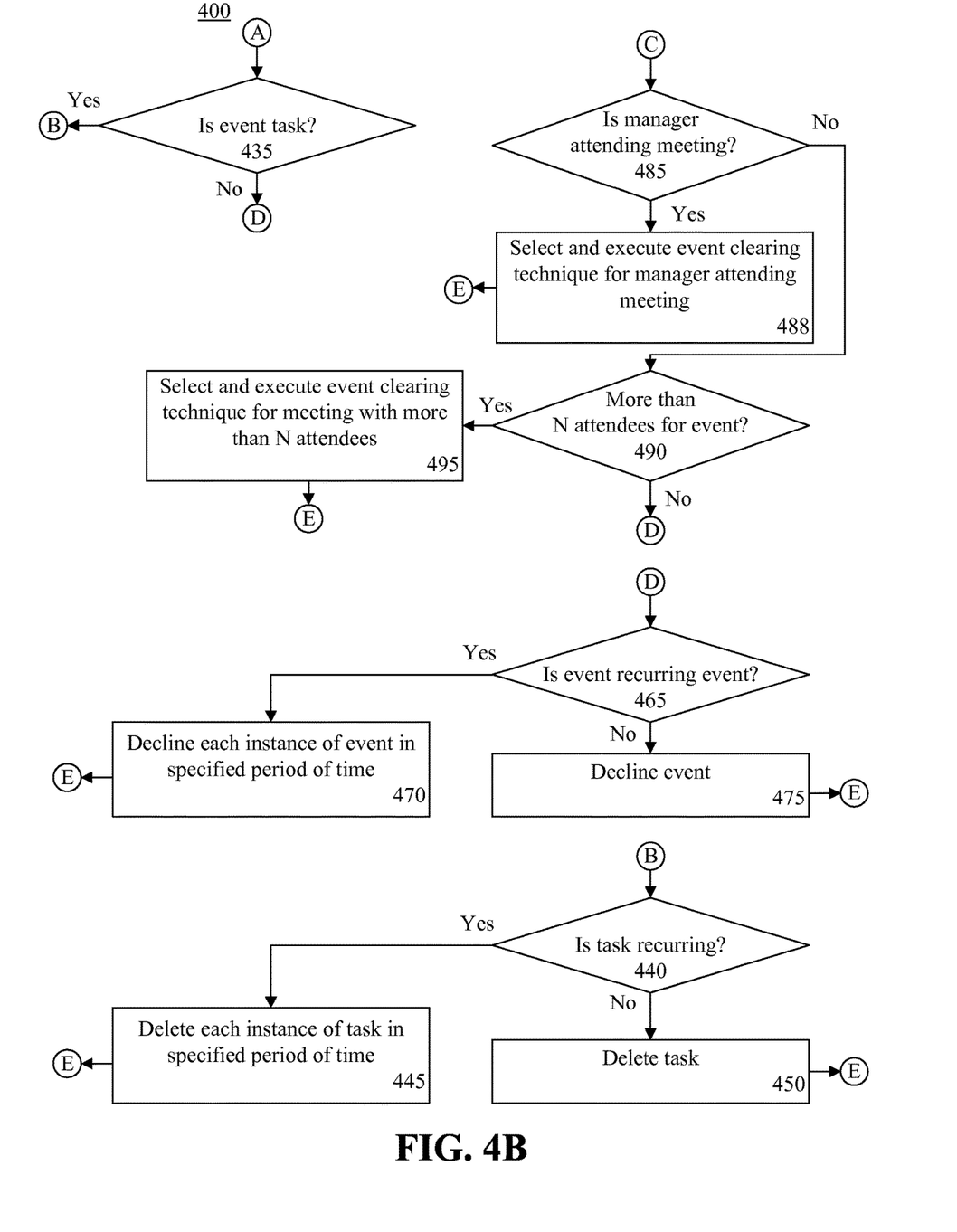

FIGS. 4A-4B, taken collectively, form a flow chart illustrating a method 400 of processing a plurality of events within a calendar application in accordance with another embodiment of the present invention. The method 400 can be implemented by the system as described with reference to FIG. 1. The flow chart illustrated in FIGS. 4A-4B, demonstrates how an appropriate event clearing technique can be determined for an event by using attributes of the event to filter or match the event. In general, the method 400 can begin with a user accessing his or her calendar from within the calendar application.

The method 400 can begin in step 405, where the system can receive a user input specifying a period of time in the calendar to be cleared. In step 410, the system can detect a plurality of events occurring during the specified period of time. In step 415, the system can optionally display a list of the detected events. In one embodiment, the system can display the detected events as a list, reviewable by the user, from which the user can select one or more individual events requiring manual processing.

For example, an event within the displayed list can be a meeting with a customer of importance to the user. The automated response of the system for clearing the meeting is to clear the meeting from the calendar and send an electronic message to the customer stating "the user will be out of town and unable to attend the meeting." Upon the user observing the meeting with the customer within the displayed list, the user can determine the meeting is too important to be automatically cleared by the system. The user can determine that contacting the customer directly and manually rescheduling the appointment in the calendar application would be a more appropriate method of clearing the meeting. In this manner, the user can view the list of detected events, determine one or more events from the list requiring manual clearing, remove the selected events from the list, and instruct the system to automatically clear the one or more remaining events on the list. In any case, presenting the list may be an optional step. If the list of event is not presented to the user, the system can proceed with automatically selecting and executing event clearing techniques for the events on the list.

The system also can provide an interface through which the user can be directed to manually clear the meeting. For example, a user input can identify the meeting to the system as an event to be manually processed. The system can provide the interface through which the user can identify the meeting as an event to be rescheduled. Through the interface, the system can query the user for a time and/or date in which to reschedule the meeting. Responsive to the user selecting the time and/or date rescheduling the event, the system can clear the selected event from the calendar of the user and create an entry for the meeting in the calendar of the user at the rescheduled time and/or date selected by the user. It should be appreciated that such an interface can allow the user to select any predetermined event clearing technique for a particular or selected event or to simply exclude selected event(s) from automated processing in favor of manual processing.

Beginning in step 420, the system can begin automated processing of the list of events, according to attributes of each event on the list. In step 420, the system can select an event from the list. In step 425, the system can determine whether the selected event is a meeting event. If so, the method can proceed to step 430. If not, the method can proceed to step 435 in FIG. 4B where the system can determine whether the event is a task. If so, the method can proceed to step 440. In this case, the system is identifying an attribute of the event, e.g. the event is a task, in order to filter or match the selected event with an appropriate event clearing technique.

In one embodiment, attributes of the event, such as persons associated with the event, can be used to determine an appropriate message to be transmitted in response to the clearing of the event from the calendar of the user. For example, the system can send a declination message to a meeting initiator, while no message is sent to other attendees of the meeting. Thus, in terms of clearing an event, different actions can be taken for different meeting participants according to the identity of the participants and/or the role of each participant in the event. In another example, the determination that an event is a task can result in the system delegating the task to another predetermined user and sending a message alerting the predetermined user to the delegation. In addition, the system can send a second message alerting other users of the task delegation. In the latter example, the message that is transmitted is determined by a plurality of attributes of the event, e.g., the event being a task and the person associated with the event.

Continuing with step 440, the system can determine whether the task is recurring. If so, the method can proceed to step 445. If not, the method can proceed to step 450. Step 440 identifies another attribute of the event, e.g. whether the selected event is recurring, in order to filter or match the selected event to an event clearing technique. The event clearing technique can be selected based on this attribute. As used herein, "a recurring event," can refer to an event that occurs on two or more occasions within the calendar of the user. In step 445, the system can delete each instance of the selected event occurring in the specified period of time. Those instances of the selected event occurring outside of the specified period of time can be left unchanged. In step 450, the selected event can be deleted. After executing the event clearing technique of either step 445 or 450, the method can proceed to step 455 in FIG. 4A.

It should be appreciated that the various event clearing techniques illustrated herein are provided for purposes of illustration only. Other event clearing techniques can be used and different decision making logic may be used based upon the particular event attributes that are detected and that are of interest to the system. The method illustrated in FIGS. 4A and 4B is intended to show how different attributes of an event can influence the selection of an event clearing technique. For example, the task may or may not be delegated and such delegation may depend upon other attributes of the selected event.

In step 455, the system can determine whether any further events remain to be processed on the list. If so, the method can return to step 420 where a next event can be selected from the list for processing. If not, the method can proceed to step 460 where the resulting calendar of the user, after execution of the event clearing techniques, can be output.

Returning to step 435 in FIG. 4B, the system can determine whether the selected event is a task. If not, the method can proceed to step 465. In step 465, the system can determine whether the selected event is a recurring event. If so, the method can proceed to step 470. If not, the method can proceed to step 475. In step 470, the system can decline incidents of the recurring event that occur within the specified period of time. Those instances of the selected event that occur outside of the specified period of time can be left unchanged. In step 475, the system can decline the selected event. After executing the event clearing technique of either step 470 or 475, the method 400 can proceed to step 455 in FIG. 4A.

Returning to step 430 in FIG. 4A, where the selected event has been determined to be a meeting event, the system can determine whether the meeting event is initiated by the user. If so, the method can proceed to step 465 in FIG. 4B and continue as described. If not, the method can proceed to step 480. The determination that the selected event is a meeting event initiated by the user provides another attribute with which to filter or match the selected event to an event clearing technique.

In step 480, the system can determine whether the meeting event requires a response. If not, the method can proceed to step 465 in FIG. 4B and continue as described. If so, the method can proceed to step 485 in FIG. 4B.

Continuing with step 485, the system can determine whether a manager is attending the meeting. If so, the method can proceed to step 488, where an event clearing technique can be selected and executed. The selected event clearing technique can be one that has been designated for use when a meeting with a manager in attendance is being cleared. The method can continue to step 455. If a manager is not attending the meeting, the method can proceed to step 490. The determination that the manager is attending the meeting event provides another attribute that can be used to select an event clearing technique for the selected event.

In step 490, the system can determine whether the meeting has more than N attendees, where "N" is a predetermined and minimum number of attendees. If so, the method can proceed to step 495 where an event clearing technique can be selected and executed. The selected event clearing technique can be one that has been designated as the event clearing technique for meetings with more than N attendees. The method can continue to step 455 and proceed as described. If the meeting does not have more than N attendees, the method can proceed to step 465 and continue as described. The determination that the event has more than N attendees provides another attribute that can be used to select an event clearing technique for the selected event.

The method 400 provides examples of the different types of attributes that can be detected and used to select an event clearing technique most appropriate to the selected event, and not as a limitation of the set of event attributes. The event clearing techniques mentioned are not intended to be an exhaustive list of event clearing techniques, but rather provide examples of event clearing techniques that may be used and matched with calendar events. For example, an event can be selectively deleted or declined according to the type of the event, which can be determined, at least in part, according to the event attributes. It should be appreciated that the manner in which attributes are used to match or select event clearing techniques can be user definable as well as the types of event clearing techniques available to process a selected event and the event attributes.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flowchart(s) and block diagram(s) in the figures illustrate the architecture, functionality, and operation of possible implementations of systems, methods, and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of processing an event within a calendar application executing within a computer hardware system, comprising:
    displaying, by a computer hardware device, a graphical user interface of the calendar application;
    receiving, based upon a first interaction by a user with a clear block icon displayed within the from a graphical user interface of the calendar application, a request by a user that specifies a period of time to clear events, wherein the period of time contained within the request is derived from a second interaction by the user with the graphical user interface;
    searching, by the calendar application and responsive to the request, a calendar data structure associated with the user to detect the event from events displayed within the calendar view and from events not displayed within the calendar view that occur within the period of time specified by the user;
    applying, by the calendar application and to the calendar data structure, a selected event clearing technique to the event; and
    displaying, within the graphical user interface of the calendar application and the selected event clearing technique has been applied to the event, a visual representation of the calendar data structure including the period of time accompanied by a visual indicator indicating the period of time has been cleared, wherein
    the selected event clearing technique is an automated programmatic action that clears the event from the calendar data structure, and
    the event clearing technique is selected, from a plurality of event clearing techniques and by the calendar application, based upon a classification of the event applied to the event based upon an attribute of the event.

2. The method of claim 1, wherein
    a plurality of attributes are identified for the detected event, and
    the classification is based upon all of the identified plurality of attributes.

3. The method of claim 1, wherein
    the attribute is a person, other than the user, associated with the detected event.

4. The method of claim 1, further comprising:
    determining that a number of attendees associated with the event exceeds a predetermined number; and
    performing the selecting only upon the number of attendees exceeding the predetermined number.

5. The method of claim 1, wherein
    the classification of the detected event is a task, and
    the selected event clearing technique includes:
        delegating the task to a predetermined another user,
        sending a first message to the predetermined another user regarding the delegated task, and
        sending a second message, to each of a plurality of other users, that the task is delegated to the predetermined another user.

6. The method of claim 1, wherein
    the detecting that the event occurs with the period of time includes detecting a recurring event including a plurality of instances of the recurring event occurring within the period of time, and
    the event clearing technique is selected for each instance of the recurring event occurring within the period of time.

7. The method of claim 1, wherein
    the selected event clearing technique includes outputting a response declining the event.

8. The method of claim 1, wherein
    the selected event clearing technique includes automatically rescheduling, by the calendar application, the event.

9. The method of claim 1, wherein
    the attribute is an identity of an initiator of the event.

10. The method of claim 1, wherein
    a plurality of events are detected that occur with the period of time; and
    selected event clearing techniques for each of the plurality of events are executed by the calendar application in a batch.

11. A computer program product, comprising
    a computer-usable storage hardware device having stored therein computer-usable program code for processing an event within a calendar application executing within a computer hardware system,
    the computer-usable program code, which when executed on the computer hardware system, causes the computer hardware system to perform:
        displaying, by the computer hardware system, a graphical user interface of the calendar application;
        receiving, based upon a first interaction by a user with a clear block icon displayed within the from a graphical user interface of the calendar application, a request by a user that specifies a period of time to clear events, wherein the period of time contained within the request is derived from a second interaction by the user with the graphical user interface;
        searching, by the calendar application and responsive to the request, a calendar data structure associated with the user to detect the event from events displayed within the calendar view and from events not displayed within the calendar view that occur within the period of time specified by the user;
        applying, by the calendar application and to the calendar data structure, a selected event clearing technique to the event; and
        applying, by the calendar application and to the calendar data structure, a selected event clearing technique to the event; and
        displaying, within the graphical user interface of the calendar application and the selected event clearing technique has been applied to the event, a visual representation of the calendar data structure including the period of time accompanied by a visual indicator indicating the period of time has been cleared, wherein the selected event clearing technique is an automated programmatic action that clears the event from the calendar data structure, and the event clearing technique is selected, from a plurality of event clearing techniques and by the calendar application, based upon a classification of the event applied to the event based upon an attribute of the event.

12. The computer program product of claim 11, wherein a plurality of attributes are identified for the detected event, and the classification is based upon all of the identified plurality of attributes.

13. The computer program product of claim 11, wherein the attribute is a person, other than the user, associated with the detected event.

14. The computer program product of claim 11, wherein the computer-usable program code further causes the computer hardware system to perform:

determining that a number of attendees associated with the event exceeds a predetermined number; and performing the selecting only upon the number of attendees exceeding the predetermined number.

15. The computer program product of claim 11, wherein the classification of the detected event is a task, and the selected event clearing technique includes:

delegating the task to a predetermined another user, sending a first message to the predetermined another user regarding the delegated task, and sending a second message, to each of a plurality of other users, that the task is delegated to the predetermined another user.

16. The computer program product of claim 11, wherein the detecting that the event occurs with the period of time includes detecting a recurring event including a plurality of instances of the recurring event occurring within the period of time, and the event clearing technique is selected for each instance of the recurring event occurring within the period of time.

17. The computer program product of claim 11, wherein the selected event clearing technique includes outputting a response declining the event.

18. The computer program product of claim 11, wherein the selected event clearing technique includes automatically rescheduling, by the calendar application, the event.

19. The computer program product of claim 11, wherein the attribute is an identity of an initiator of the event.

20. The computer program product of claim 11, wherein a plurality of events are detected that occur with the period of time; and selected event clearing techniques for each of the plurality of events are executed by the calendar application in a batch.

\* \* \* \* \*